United States Patent
Singh et al.

(10) Patent No.: US 8,620,305 B2
(45) Date of Patent: Dec. 31, 2013

(54) METHODS AND SYSTEMS FOR A MOBILE DEVICE TESTING FRAMEWORK

(75) Inventors: Siddhartha Singh, San Francisco, CA (US); Michael Hamlin, Beverly Hills, CA (US)

(73) Assignee: salesforce.com, inc., San Francisco, CA (US)

(*) Notice: Subject to any disclaimer, the term of this patent is extended or adjusted under 35 U.S.C. 154(b) by 228 days.

(21) Appl. No.: 13/135,056

(22) Filed: Jun. 23, 2011

(65) Prior Publication Data

US 2011/0320879 A1    Dec. 29, 2011

Related U.S. Application Data

(60) Provisional application No. 61/357,964, filed on Jun. 23, 2010.

(51) Int. Cl.
*H04W 24/00* (2009.01)

(52) U.S. Cl.
USPC .............. 455/424; 455/422.1; 455/425

(58) Field of Classification Search
USPC .......... 455/423, 424, 425, 456.3, 414.1, 90.1, 455/422.1
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz | |
| 5,649,104 A | 7/1997 | Carleton | |
| 5,715,450 A | 2/1998 | Ambrose et al. | |
| 5,761,419 A | 6/1998 | Schwartz | |
| 5,819,038 A | 10/1998 | Carleton | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |

(Continued)

*Primary Examiner* — Cong Tran
(74) *Attorney, Agent, or Firm* — Dergosits & Noah LLP; Todd A. Noah

(57) ABSTRACT

A mobile device test framework is used in combination with client controllers and device controllers so that a single mobile device API test can be used with mobile devices having different operating system platforms. The client controllers can provide information specific to the client and the device controllers can provide information needed to apply the test to each of the mobile device platforms. The test framework can navigate through the controls of the mobile device GUIs and input information. The test framework can then check that the text and images displayed by the mobile devices match the expected information.

21 Claims, 7 Drawing Sheets

(56) References Cited

U.S. PATENT DOCUMENTS

| | | | |
|---|---|---|---|
| 6,477,580 B1 * | 11/2002 | Bowman-Amuah | 709/231 |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier | |
| 6,654,032 B1 | 11/2003 | Zhu | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,340,411 B2 | 3/2008 | Cook | |
| 7,401,094 B1 | 7/2008 | Kesler | |
| 7,526,681 B2 * | 4/2009 | Anafi et al. | 714/38.14 |
| 7,620,655 B2 | 11/2009 | Larsson | |
| 7,698,160 B2 | 4/2010 | Beaven et al. | |
| 7,774,504 B2 * | 8/2010 | Chene et al. | 709/246 |
| 8,010,663 B2 | 8/2011 | Firminger et al. | |
| 8,082,301 B2 | 12/2011 | Ahlgren et al. | |
| 8,095,413 B1 | 1/2012 | Beaven et al. | |
| 8,095,594 B2 | 1/2012 | Beaven et al. | |
| 8,160,572 B2 * | 4/2012 | Bovet | 455/424 |
| 8,275,836 B2 | 9/2012 | Beaven et al. | |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2004/0001092 A1 | 1/2004 | Rothwein et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2008/0071657 A1 * | 3/2008 | Matic | 705/35 |
| 2009/0007074 A1 * | 1/2009 | Campion et al. | 717/124 |
| 2009/0063415 A1 | 3/2009 | Chatfield et al. | |
| 2009/0219819 A1 * | 9/2009 | Haverinen et al. | 370/241 |
| 2010/0146488 A1 * | 6/2010 | Chen et al. | 717/128 |
| 2011/0136485 A1 * | 6/2011 | Gordiyenko et al. | 455/424 |

* cited by examiner

METHODS AND SYSTEMS FOR A MOBILE DEVICE TESTING FRAMEWORK

CLAIM OF PRIORITY

This application claims the benefit of U.S. Provisional Patent Application No. 61/357,964 entitled, METHODS AND SYSTEMS FOR IMPLEMENTING A MOBILE TESTING FRAMEWORK, by Singh, et al., filed Jun. 23, 2010.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to methods and system for a mobile device test framework that is compatible with various mobile devices having different operating systems.

BACKGROUND

In conventional mobile device test framework software such as software as a service (SaaS), different test framework software must be developed for different mobile devices that use the software. For example, the Apple iPhone use an operating system written in objective C programming language, the Research In Motion, Blackberry and Google Android devices uses an operating system written in Java and MicroSoft windows devices uses an operating system written in C++. An approach to dealing with the different mobile device operating system languages has been to develop different frameworks for each different mobile device operating system language and test each framework individually to determine if the test framework is correct.

Unfortunately, conventional mobile device test frameworks are inefficient because a test framework must be developed and individually tested for each mobile platform. Further, when one mobile test framework is modified, this change must be applied to all other mobile test frameworks.

Accordingly, it is desirable to provide a single mobile device test framework that can be used with mobile devices having different operating systems to improve performance and efficiency of the testing of the mobile device test framework.

BRIEF SUMMARY

In accordance with embodiments, there are provided mechanisms and methods for a single mobile test framework in an online demand service environment that can be used to test application software on multiple mobile device platforms and test environments. These mechanisms and methods can enable embodiments to provide more efficient and flexible testing of application software on mobile devices because only a single test framework may be needed to test multiple mobile device platforms. The single testing framework can be used to test the GUI software on various different mobile devices having multiple operating systems. A benefit of the single test framework is that only one test framework software code needs to be written for all platforms which significantly reduces the amount of time and computer program code needed to develop the SaaS product.

In an embodiment and by way of example, methods and systems for a mobile test framework is written in a single programming language and tested on many different mobile device platforms, such as: iOS, Android, Blackberry, etc. The general methodology employed in the testing framework is to abstract out the mobile device environment to allow individual test execution across multiple mobile devices and run environments. Each mobile device platform includes specific characteristics including: device options, device types and run environments. Each of these characteristics can be processed as parameters by the system during testing to allow the same test to be switched between the different platforms and operating environments. For example, the testing framework can be written in JAVA While one or more implementations and techniques are described with reference to an embodiment of the mobile test framework in an online demand service environment is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Systems and methods are provided for a mobile device testing framework in an online demand service environment.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing mobile device testing framework in an online demand service environment will be described with reference to example embodiments.

The following detailed description will first describe setting up data for the application in accordance with aspects and embodiments.

The SaaS Mobile Test Framework provides end-to-end automated testing of critical mobile application functionality. Test Framework can perform various functions such as creating a new record on an actual device, propagating that new record over the carrier network to Universal Data Access Server (UDAS), verifying the new record creation in the SaaS database using the SaaS Application Programming Interface (API) and other functions.

Figure 1:
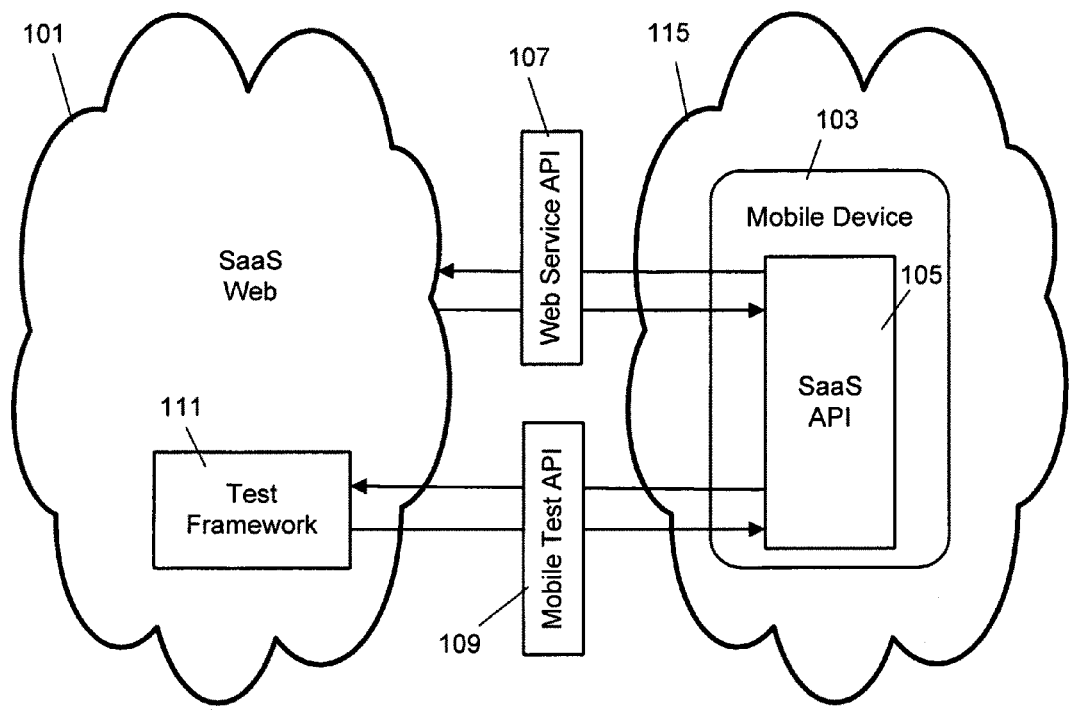
FIG. 1 illustrates a block diagram of an example of a mobile device test framework used to test a mobile device platform.

FIG. 1 illustrates a representative mobile test system in an online demand service environment in an embodiment. A SaaS API 105 can be downloaded and run on the mobile device 103. The SaaS website 101 may communicate with the SaaS API 105 on the mobile device 103 through a web service API 107. The mobile device 103 can operate in a variety of environments 115. The mobile device 103 can have various different operating systems and the web service API 107 can identify the operating system and perform the necessary processing required for the mobile device 103 to communicate with the SaaS website 101.

In an embodiment, the SaaS API software 105 can be tested on the mobile device 103 using a mobile test framework 111 and a mobile test API 109 connected between the SaaS API 105 and the SaaS website 101. The mobile test framework 111 store test, client, mobile device and other information on a test framework database 113. The mobile test framework 111 and a mobile test API 109 can monitor and test the operation of the SaaS API 105 and the software on the SaaS website 101. The test framework 111 and mobile test API 109 can be universal in its ability to operate with various different mobile device operating systems. Thus, the illustrated configuration can be used for any type of SaaS software and various types of mobile device operating systems including: iPhone, Blackberry, Android and Windows operating systems. The mobile device test framework is more efficient because a single mobile test API is compatible with any mobile device operating system and any mobile device.

Figure 2:
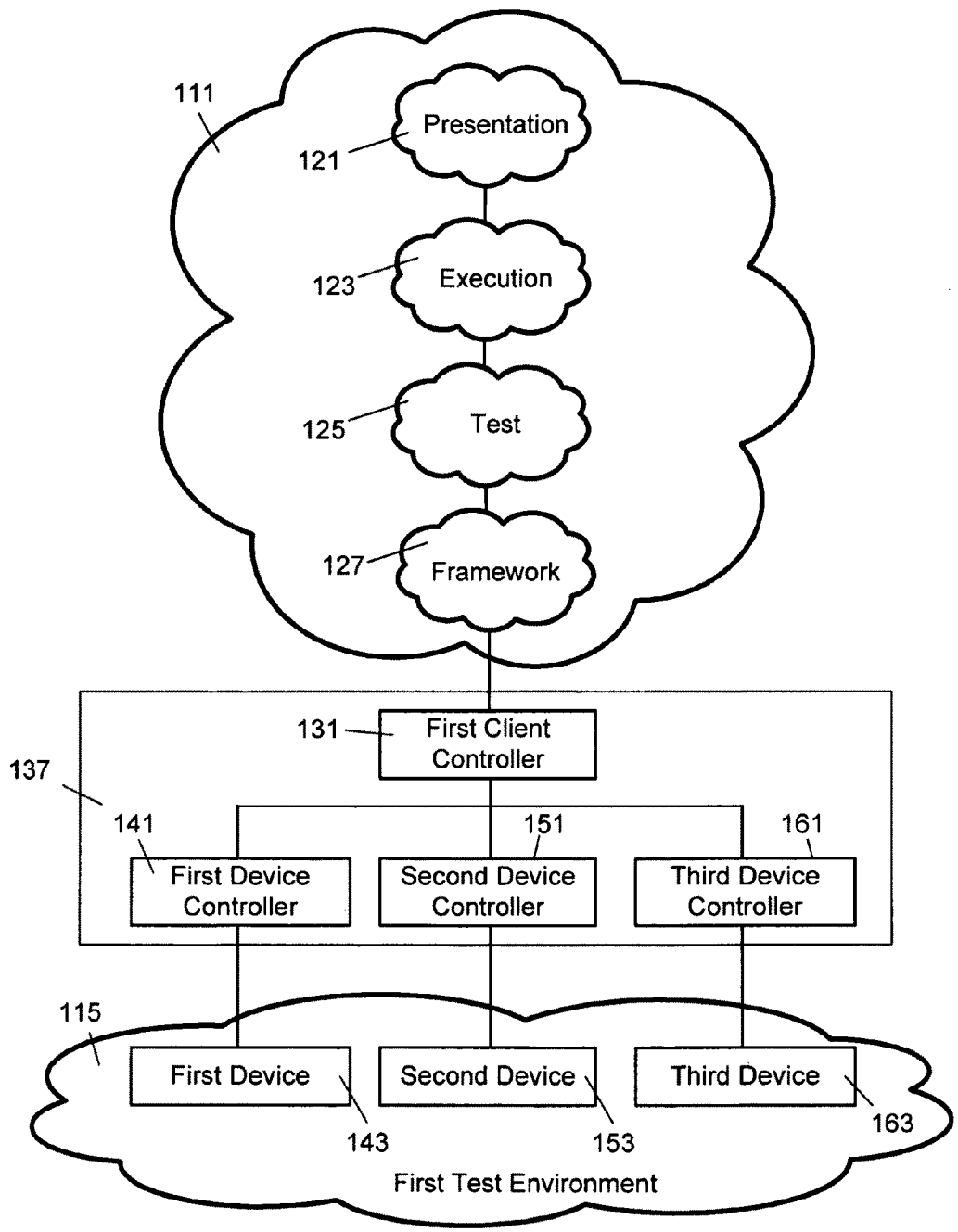
FIGS. 2 and 3 illustrate block diagrams of examples of mobile device test frameworks used to test multiple mobile device platforms.

With reference to FIG. 2, a representation of an embodiment of the mobile test system is illustrated. The mobile test framework 111 can include several components including: a presentation component 121, an execution component 123, a test component 125 and a framework component 127. These components in the mobile test framework 111 can work together to perform testing of applications running on various mobile devices 143, 153, 163 each operating on different operating system platforms. In this illustrated configuration, the mobile test framework 111 is coupled to a first client mobile test API 137. The first client mobile test API 137 can include a first client controller 131 and multiple device controllers 141, 151, 161 that are connected to the corresponding mobile devices 141, 151, 161. Thus, a single test framework 111 can be written in a single programming language and used in combination with the first client mobile test API 137 to test mobile devices 143, 153, 163 in a first environment 115. Because the device controllers 141, 151, 161 perform the protocol processing for the mobile devices 143, 153, 163, the test case author may only need to describe these mobile device actions or operations in the most high-level terms that are not device specific. Thus, these high level terms may be applicable to all device platforms that are supported by the SaaS provider.

In this embodiment, tests from the mobile test framework 111 are transmitted through the first client controller 131 and the first device controller 141 to the first device 143 having a first operating system. The first client controller 131 can apply platform independent information about the first client and the first device controller 141 can apply information about the first device platform so the test can be applied to the first mobile device 143. The same test can be applied through the mobile test framework 111 to the first client controller 131 to a second device controller 151 that can apply information about the second device platform so the same test can be applied to the second mobile device 153. The test can also be applied through the mobile test framework 111 to the first client controller 131 to a third device controller 161 that can apply information about the third device platform so the same test can be applied to the third mobile device 163. Thus, rather than requiring a different test frameworks for each mobile device platform, a single mobile device test framework 111 can be used with multiple device controllers 141, 151, 161 to test all of the mobile platforms used by the client. Although three device controllers 141, 151, 161 and three mobile devices 143, 153, 163 are illustrated, in other embodiments, any number of device controllers and mobile devices can be used with the illustrated test system.

Figure 3:
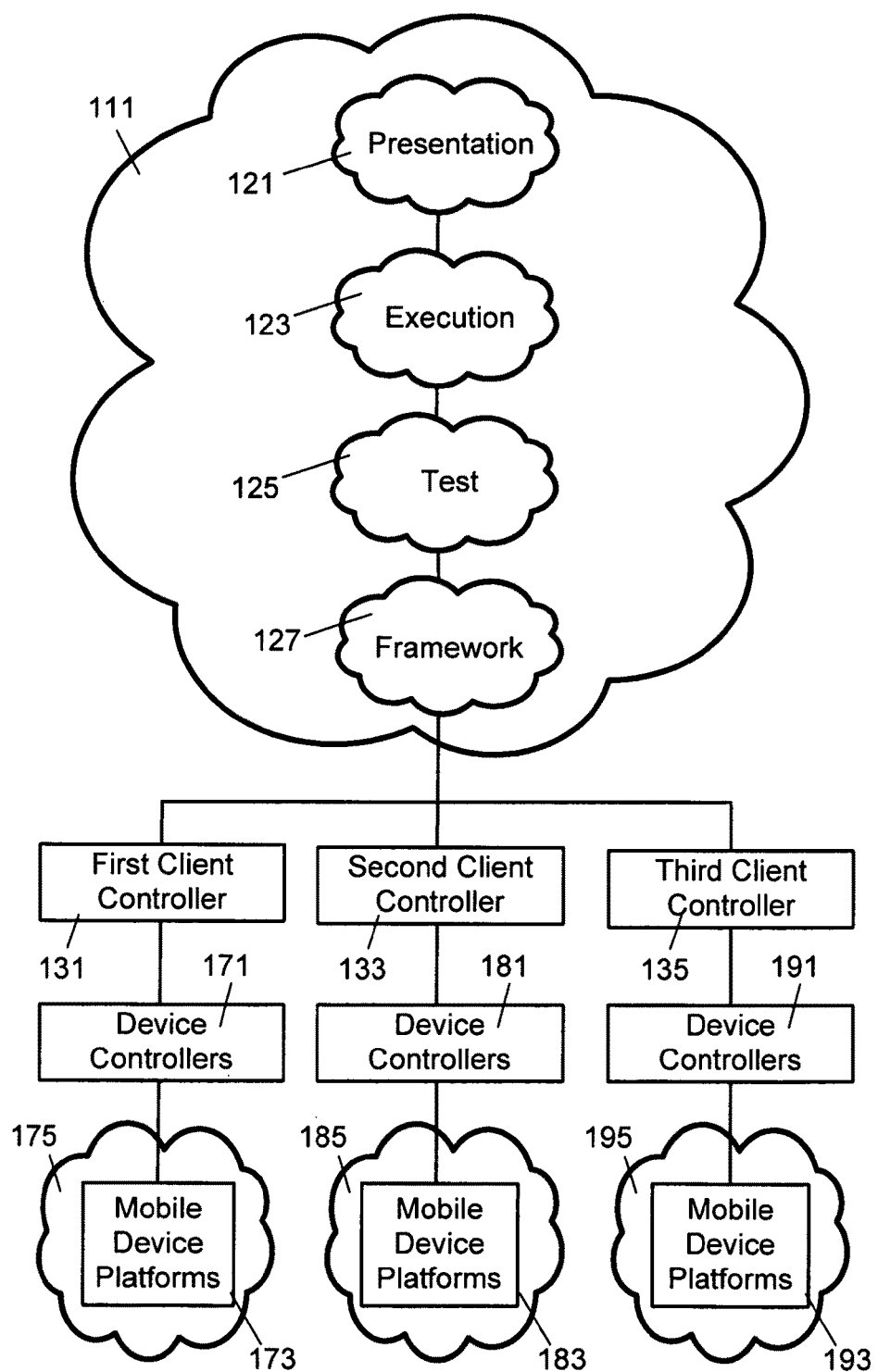

The test frame system has been described with reference to a single client controller. However, in other embodiments, the system can also be used to test mobile devices operating on multiple client controllers. With reference to FIG. 3, another representation of an embodiment of the mobile test system having a single mobile device test framework 111 used with multiple clients is illustrated. In this embodiment, the mobile test framework 111 is used with multiple client controllers 131, 133, 135 and can represent an expanded version of the system illustrated in FIG. 2. Each of the client controllers 131, 133, 135 can provide information about the client. Thus, the first client controller 131 can provide information about the first client, the second client controller 133 can provide information about the second client and the third client controller 135 can provide information about the third client. The client controllers 131, 133, 135 can communicate with the corresponding mobile device controllers 171, 181, 191. Each set of mobile device controllers 171, 181, 191 can include multiple mobile device interfaces which can communication with the different mobile device platforms 173, 183, 193 in the corresponding test environments 173, 183, 193. The mobile device controllers 171, 181, 191 can be the same or different depending upon the types of mobile device platforms that are supported by the clients. Similarly, the test environments 173, 183, 193 can be determined by the clients. Although three client controllers 131, 133, 135 are illustrated, in other embodiments, any number of client controllers can be used with the single test framework 111.

In an embodiment, there can be one or more client controller classes for each client. There can be more client controllers if there are more than one set of client applications. Each client controller for a single client can each utilize a set of different device controllers.

Figure 4:
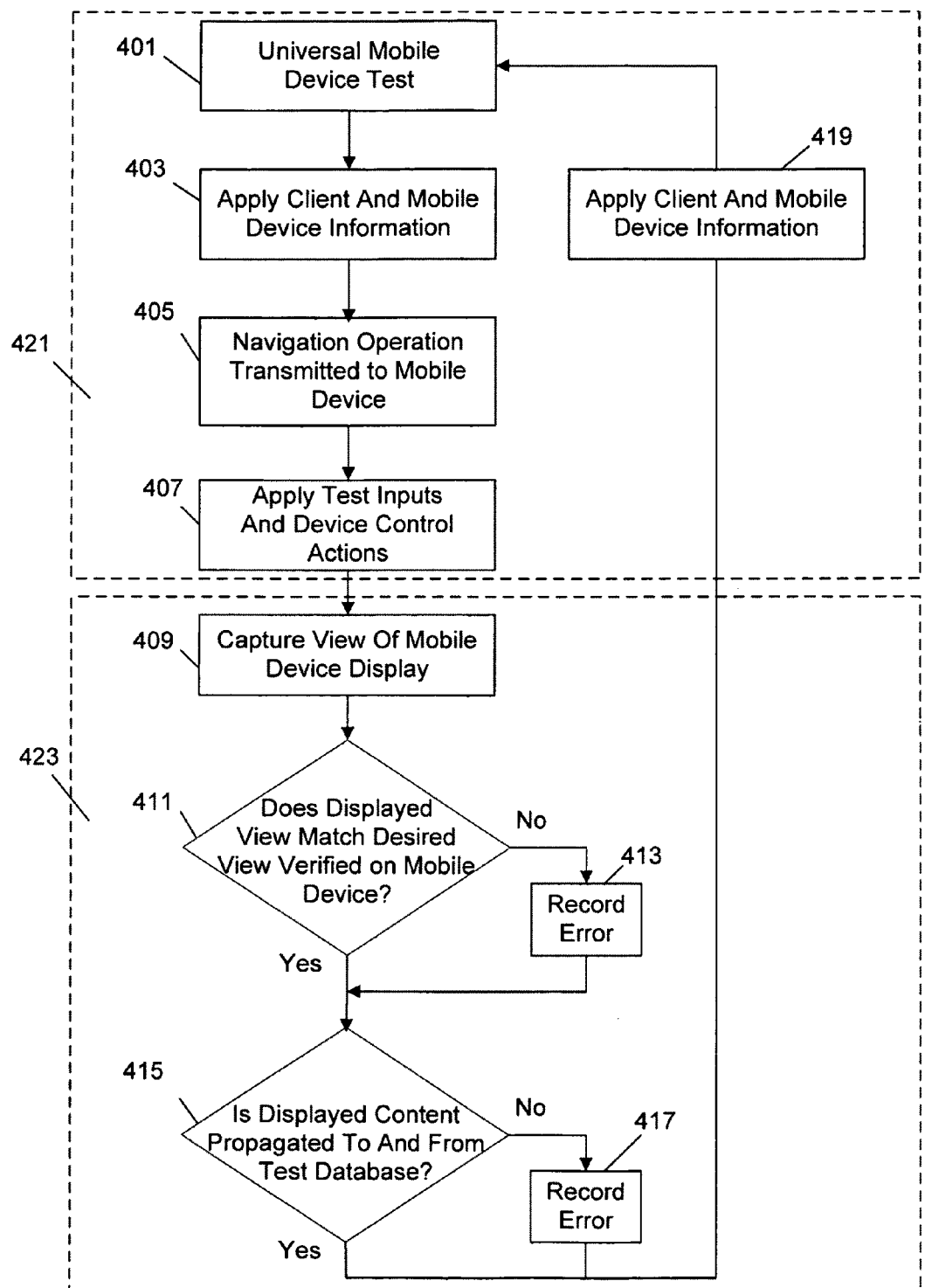
FIG. 4 is an operational flow diagram illustrating a high level overview of a technique for testing a mobile device API in an online demand service environment in an embodiment.

With reference to FIG. 4, a flowchart illustrating the basic test procedures is shown. A single universal mobile device test 401 is designed to test the application program for mobile devices having different platforms. The test control is transmitted to a client controller and a device controller that apply the client and mobile device platform information to the test control 403. Thus, each test case may not be tied directly to a particular mobile device platform and tests such as "create a new account record" should use the same logic regardless of the mobile device platform. However, the test cases may require that certain features (e.g. Tabs) are supported, and certain mobile device platforms may not support these features. Therefore, in an embodiment, the test case may be able to query the test framework to verify that the device controller supports a particular feature, and all applicable tests can be run against all device controllers that support the feature. The device controllers can extend the Client Controller API and therefore implements these functions. For example, iPhone, BlackBerry and Windows Mobile can extend the Device Controller and implement platform specific commands.

The test control can be a navigation operation that is transmitted to the mobile device 405. The test may also apply data inputs and device control actions to the mobile device 407. This first portion of the testing can be referred to as the mobile device "navigation" 421. For example, the navigation may include high-level instructions such as "edit current record" which requires multiple steps to find the proper navigation elements. Once the navigation elements are found, the test may have the mobile device click on the elements. In an embodiment, data can be input to the mobile devices through a "send keys" method which can allow individual keystrokes to be sent to the device. This method can also be used on mobile devices having touch screen inputs such as the iPhone.

In response to the test control, test inputs and device control actions, the mobile device will display information which can be captured by the test framework 409. The display information may include both text and/or images. There can be multiple ways to capture the display information from the mobile device. For example, the image can be obtained directly from the mobile device and the text can be obtained using OCR technology from the text portion of the image. In some tests, the system may only test the displayed information of interest or importance. Thus, the test system can capture some data or all data from the mobile device display and compare the mobile device display information to a desired view 411.

In an embodiment, the test may include triggers that may fire when the mobile device being tested displays either text and/or images that are expected by the test. If the display information does not match the expected information, the system can record the error 413. If the display information does match the expected information, the system may record this correct display as well. The system may also check that the displayed content was propagated to and from the test database 415. If the display content was not propagated to or from the test database, the system can record the error 417 and may also record the proper operation of the mobile device if the content was propagated to or from the test database. The display capturing and data confirmation processes can be referred to as "verification" 423.

After the verification, the system may apply the client and mobile device information 419 to data being transmitted back to the test framework 401 and the next step of the mobile device test can be performed. The API testing may continue if the navigation errors are correctable or not correctable. Alternatively, the testing may be terminated as a result of a navigation error. Once the mobile device test is complete, the mobile device test framework can produce a report that includes the recorded errors in the mobile device navigation and display.

Figure 5:
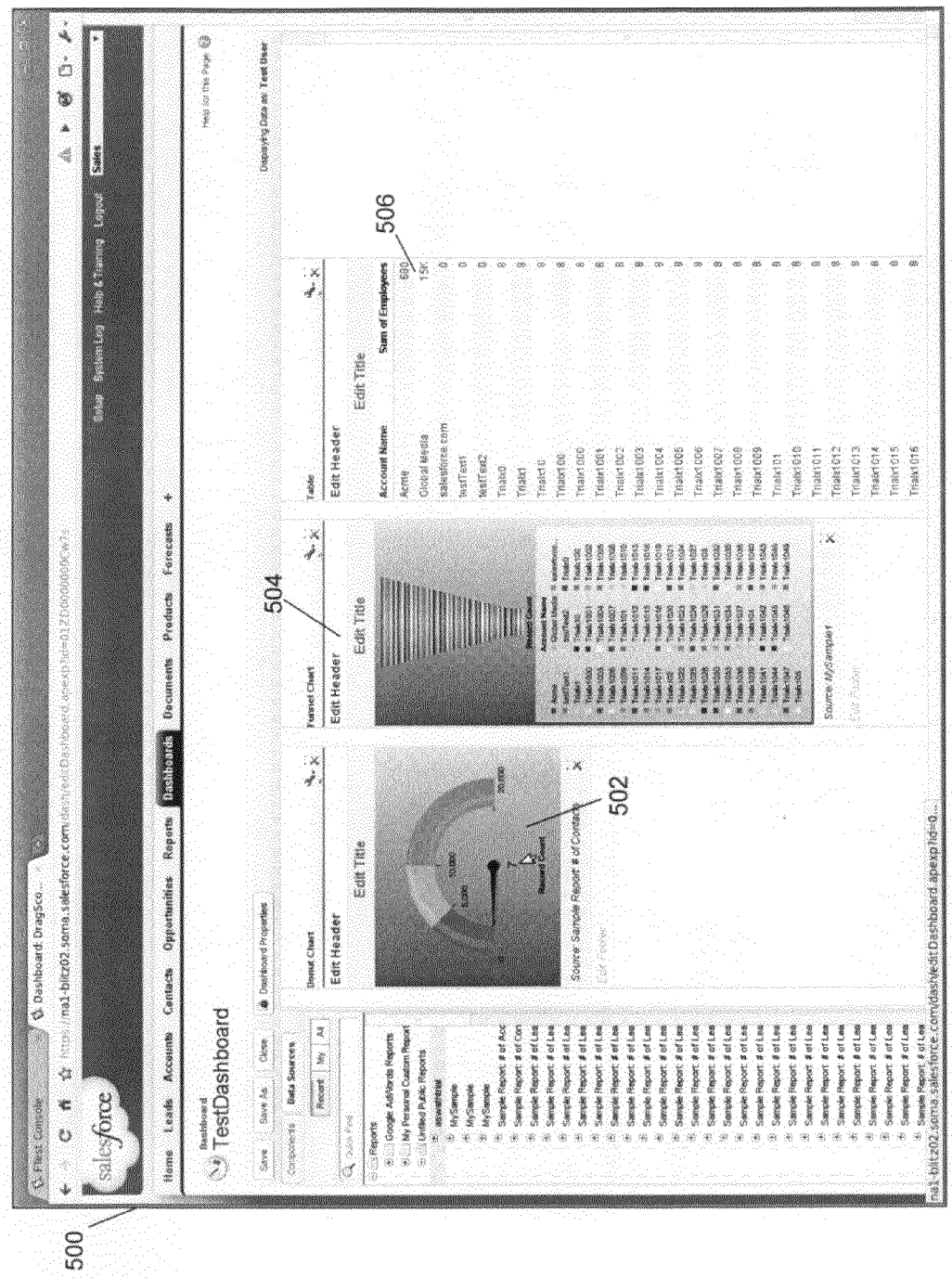
FIG. 5 illustrates a representative web browser with a GUI application for testing a dashboard framework in an online demand service environment in an embodiment.

With reference to FIG. 5, an example of a possible mobile device display 500 is illustrated. The mobile device display 500 can be a collection of information areas and can have various controls including buttons, sliders and other data input fields that create a graphical user interface (GUI). In this example, a mobile device display 500 can include a donut chart 502, a funnel chart 504 and a table 506. It can be extremely important for the mobile device API to provide accurate information to the user. However, not all display information is critical. In this example, the donut chart 502, the funnel chart 504 and the table 506 may be the portions of the mobile device display that are the most important for test accuracy. Thus, the mobile device test framework may verify that the donut chart 502, the funnel chart 504 and the table 506 match the expected values and that the display content was propagated to or from the test database as described.

With reference to FIGS. 2 and 3, additional details of the test system components will be described. The test framework 111 can include a presentation tool 121 that can include software tools for continuous integration which continuously processes applying software quality control. The presentation tool 121 can be used for scheduling and executing the mobile device API tests. The presentation tool 121 can also be used for reporting the test results and metrics. In an embodiment, the presentation tool 121 can be implemented through a continuous integration tool such as Hudson or Jenkins which are both written in Java. In other embodiments, the presentation tool 121 can be written in another programming language.

The execution tool 123 can be a software tool for building, deploying and testing scripts and parameters. In an embodiment, the execution tool 123 can be Apache Ant which is a software tool automated software building processes or a similar tool. The test tool 125 can include a unit testing framework through which individual units of source code can be tested. In an embodiment, the test tool 125 can be JUnit which is written in Java or a similar unit testing framework written in another programming language.

The test framework 127 is the actual test program that is written for an API for the mobile devices. In an embodiment, different test frameworks 127 are written for different APIs. However, because the test framework 127 is compatible with various different mobile device platforms, different test frameworks 127 do not have to be written for each different mobile device platform. In an embodiment, the test framework 127 can be written in Java so that it is compatible with the presentation tool 121, the execution tool 123 and the test tool 125. However, in other embodiments, the test framework 127 can be written in any other programming language that it is compatible with the presentation tool 121, the execution tool 123 and the test tool 125.

The client controllers 131, 133, 135 are also platform independent tools that can be written in Java or other programming language that it is compatible the test framework 111. The client controllers 131, 133, 135 store various types of information about the clients. The client information may be gathered through a mobile device 103 operated by the client. The client information can be gathered at various times while the client interacts with the mobile test framework through the mobile devices 103. For example, data can be collected during an activation process. A client can be activated before any testing of the application software can be performed and during the activation process, the client can input information about the state of the first client. Device specific information can be stored and retrieved from the Device class. Examples of the device specific information can include: Device Id, Make, Model, Phone Number, Screen Height/Width, connect data cable, reset battery, capture screen, Get all visible text in region, get visible text with background color, wait for text to appear, get image position, get last find coordinates, start/stop video capture, etc.

Based upon the client information, the first client controller 131 can provides a high-level interface control commands including:

activateClient( )
    deactivateClient
    syncRefresh( )
    syncAll( )
    createRecord
    openRecord(boolean for Edit)
    closeCurrentRecord(boolean save)
    deleteRecord( )
    getFieldValue(key)
    setFieldValue(key, value)

Each client controller 131, 133, 135 can be coupled to multiple device controllers 141, 151, 161 which can each support a different mobile device platform. The client controllers 131, 133, 135 can be used as interfaces between different types of mobile devices 143, 153, 163 and the mobile test framework 111. The mobile device test framework 111 can provide test cases that are transmitted to the first client controller 131 and the device controllers 141, 151, 161 to the mobile devices 143, 153, 163. The device controllers 141, 151, 161 can provide test navigation methods for the different platforms of each of the mobile devices 143, 153, 163 and verification of the test results. As discussed above with reference to FIG. 4, the navigation can be performed by navigating the mobile devices 143, 153, 163 through different screens. Then the verification can be performed by capturing the screen contents of the mobile devices and comparing the captured screen contents to expected screen contents. If the captured screen contents match the expected screen contents, the mobile devices 143, 153, 163 have passed this portion of the test. Conversely, if the captured screen contents do not match the expected screen contents, the mobile devices 143, 153, 163 have not passed this portion of the test.

The device controllers 141, 151, 161 can provide high level navigation commands to the mobile devices 143, 153, 163 for testing purposes. These navigation commands can include:

gotoTab(String)
    gotoListItem(String)
    gotoDetailField(String)
    goBack( )
    gotoRootView( )
    wait(Integer minimumSeconds)
    openFieldEdit(String)
    enterFieldEditInput(String)
    selectFieldEditItem(String)
    cancelFieldEdit( )
    gotoAppInfo( )
    selectAppInfoAction(String)
    ensureApplicationUnlocked( )

The device controllers 141, 151, 161 can also provide interface commands to assist with the verification of the test results of the mobile devices 143, 153, 163. These interface commands can include:

boolean verifyTabSelected(String)
    boolean verifyTextPresent(String)
    boolean verifyListItemPresent(String)
    String getListItemValue(String name)
    String getFieldValue(String name)
    String getAppInfoValue(String category, String fieldName)
    Image getScreenShot( )
    String getAllVisibleText( )

The testing performed by the test framework 111 can include any combination of navigation commands to the mobile application and verification that the mobile device is displaying the expected data.

For example, a navigation test case from the test framework 111 may first instruct the mobile device to navigate to a "Search Tab" in the mobile application and then navigate to the "Accounts Item." This set of test commands can be transmitted from the test framework 111 to the first client controller 131 to the device controllers 141, 151, 161. The device controllers 141, 151, 161 can covert the test commands to the corresponding protocols and transmit the test commands to the corresponding mobile devices 143, 153, 163.

The Device Controllers 141, 151, 161 are device platform specific because each operating system can use different navigation protocols. For example, the navigation commands for the Blackberry, Windows Mobile, iPhone and other mobile devices are all different. In order to perform the same navigation on multiple operating system platforms, the Device Controllers 141, 151, 161 can be decoupled from their implementation. Thus, the Device Controller implementations can be: Blackberry Controller, Windows Mobile Controller, and iPhone Controller. Each device platform can have a specific device controller. Thus, the device controllers 141, 151, 161 may each transmit different commands the mobile devices 143, 153, 163 in order to enter a predetermined search text and click the "Search" buttons on the mobile devices 143, 153, 163 or any other control commands.

In an embodiment, the device controllers 141, 151, 161 include a remote mobile application testing API. With the remote mobile application testing API, the inputs to the mobile devices 143, 153, 163 can be entered by using specific input commands such as "send keys." In response to the input commands, the mobile devices 143, 153, 163 can perform the commanded task. In an embodiment, the device controllers 141, 151, 161 can include mobile test automation such as, DeviceAnywhere, Selenium, Frank or other suitable software testing systems. For example, the device class can encapsulate the DeviceAnywhere Device API which is utilized by the device controller implementations.

For example, the mobile devices 143, 153, 163 may have been commanded to perform a search and the displayed search results can be captured by the device controllers 141, 151, 161 and compared to the expected display. If the captured screen content matches the expected screen content, the mobile devices 143, 153, 163 have passed this portion of the test and additional navigation and verification testing can be performed. If the captured screen content does not match the expected screen content, the mobile devices 143, 153, 163 have not passed the test.

The verification process compares the captured screen display with a predetermined expect view which can include some or all of the display characteristics. This verification process may look for specific text, images or other displayed information. Once this data is captured, it is compared to the expected data that should be displayed if the system is operating properly. For example, the test verification can check one or more specific values displayed on the captured screen and/or the appearances of some or all of the captured screen content.

In addition, the test framework may also be able to verify data changes that are propagated to and from the SaaS central database correctly. The verification of data changes can be implemented by detecting whether the expected data appears in the test framework database. The test framework may simulate a change that is made by the client and apply this client change to the testing of the API on the mobile devices 143, 153, 163. Data changes can be verified at the server by issuing an API request to the core server. For example, to create a new account on the device and synch the device, the system can verify that the new record was actually transmitted successfully. Alternatively, an account can be created on the server, the client can be refreshed and the system can verify that the new account shows up.

A test can be used to test a mobile device such as an Apple iPhone. The test parameters can set to define the execution as being performed by sanity suite, the test device as an iPhone and define the interface as mock. The test program can include the steps of launching the API test, inputting a user name and password and verifying the input information.

Figure 6:
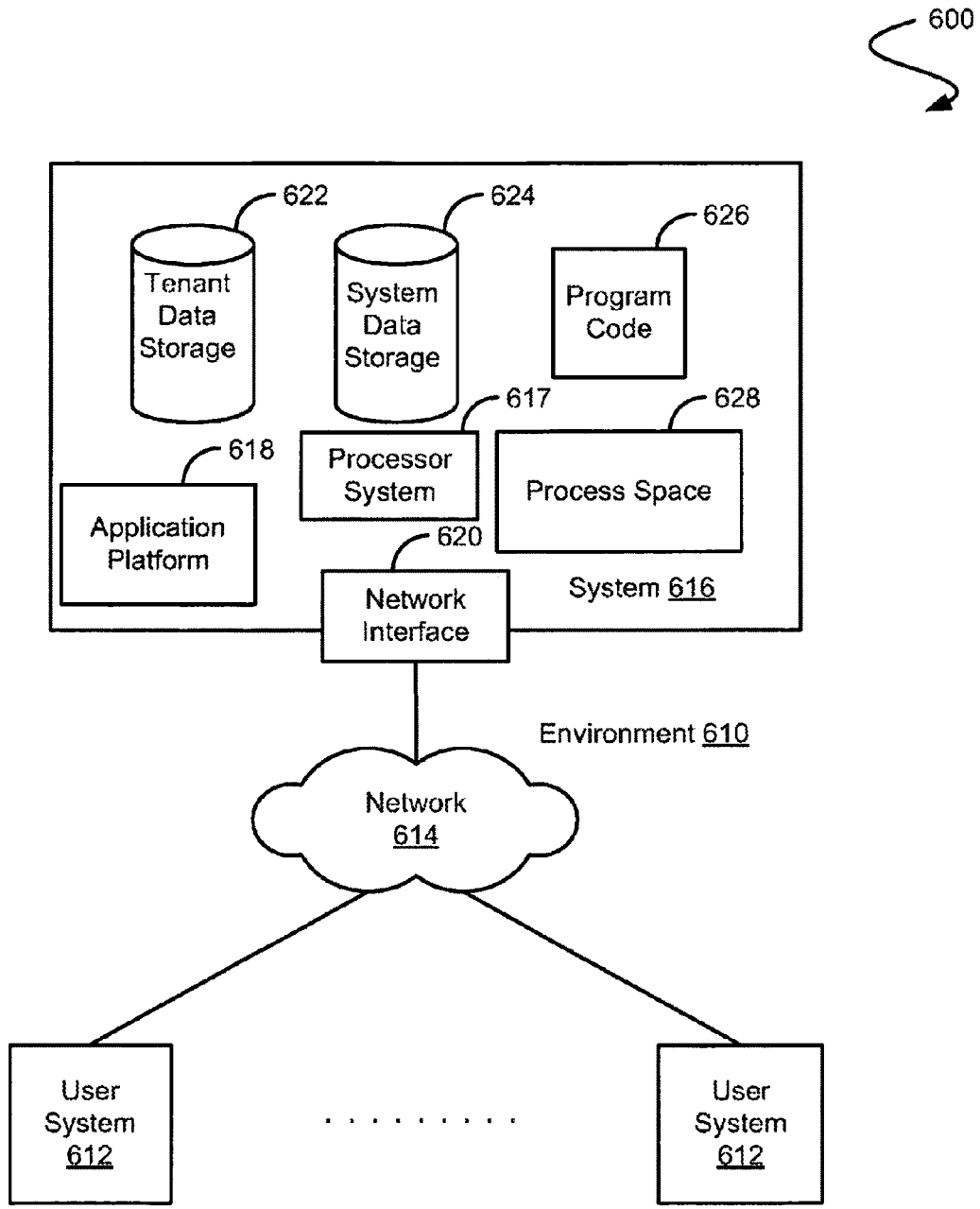
FIG. 6 illustrates a block diagram of an example of an environment wherein an on-demand database service might be used.

FIG. 6 illustrates a block diagram of an environment 610 wherein an on-demand database service might be used. Environment 610 may include user systems 612, network 614, system 616, processor system 617, application platform 18, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, web pages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 16 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
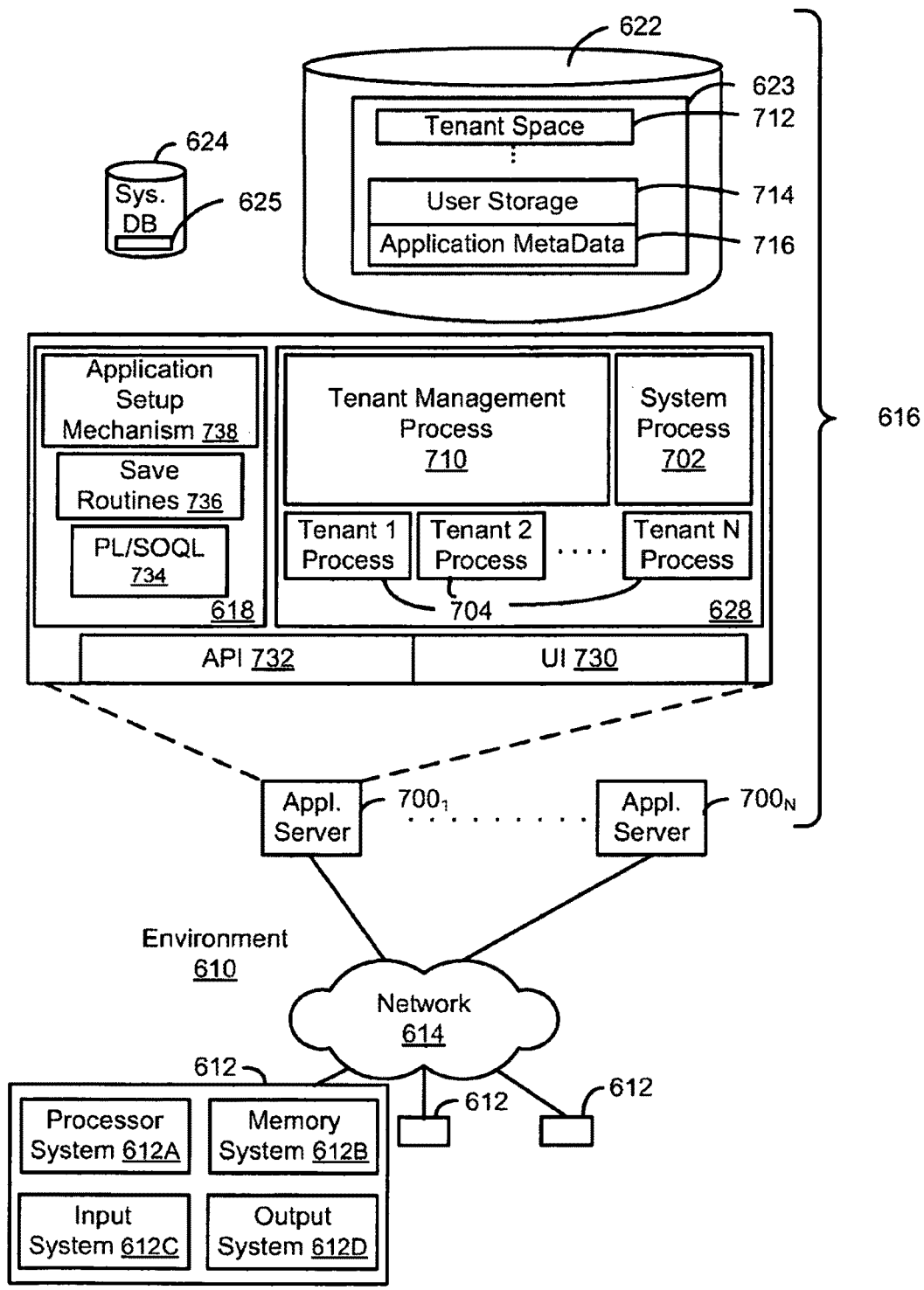
FIG. 7 illustrates a block diagram of an embodiment of elements of FIG. 7 and various possible interconnections between these elements.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $1000_1$-$1000_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 1000 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 34 that provides a programming language style interface extension to API 732. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for testing mobile devices in an online demand service environment, the method comprising:
providing a mobile test framework for testing a mobile application, wherein the mobile test framework is configured to remotely operate a plurality of mobile devices;
storing first platform dependent data on a first device controller in communication with a client controller, wherein the first device controller resides outside the mobile test framework; and
transmitting by the mobile test framework, a navigation control through the first device controller to a first mobile device having a first platform.

2. The method of claim 1 further comprising:
storing second platform dependent data on a second device controller in communication with the client controller; and
transmitting by the mobile test framework, the navigation control through the client controller and the second device controller to a second mobile device having a second platform that is different than the first platform.

3. The method of claim 2 further comprising:
storing third platform dependent data on a third device controller in communication with the client controller; and
transmitting by the mobile test framework, the navigation control through the client controller and the third device controller to a third mobile device having a third platform that is different than the first platform or the second platform.

4. The method of claim 1 further comprising:
verifying by the first device controller, a first screen content of the first mobile device that corresponds to the navigation control.

5. The method of claim 4 further comprising:
verifying by the second device controller, a second screen content of the second mobile device that corresponds to the navigation control.

6. The method of claim 1 further comprising:
identifying by the first device controller, a first test error due to a first screen content of the first mobile device that does not corresponds to the navigation control.

7. The method of claim 6 further comprising:
identifying by the second device controller, a second test error due to a second screen content of the second mobile device that does not corresponds to the navigation control.

8. The method of claim 7 further comprising:
identifying by the third device controller, a third test error due to a third screen content of the second mobile device that does not corresponds to the navigation control.

9. A method for testing mobile devices in an online demand service environment, the method comprising:
providing a mobile test framework for testing a mobile application, wherein the mobile test framework is configured to remotely operate a plurality of mobile devices;
storing first client dependent data on a first client controller in communication with the mobile test framework, wherein the first client controller resides outside the mobile test framework; and
transmitting by the mobile test framework, a navigation control through the first client controller to a first mobile device having a first platform.

10. The method of claim 9 further comprising:
storing first platform dependent data on a first device controller in communication with the first client controller; and
identifying by the first device controller, a test error due to a first screen content of the first mobile device that does not corresponds to the navigation control.

11. The method of claim 9 further comprising:
storing second client dependent data on a second client controller in communication with the mobile test framework; and
transmitting by the mobile test framework, the navigation control through the second client controller to a second mobile device having a second platform that is different than the first platform.

12. The method of claim 11 further comprising:
storing second platform dependent data on a second device controller in communication with the client controller; and
verifying by the second device controller, a screen content of the second mobile device that corresponds to the navigation control.

13. The method of claim 11 further comprising:
storing second platform dependent data on a second device controller in communication with the second client controller; and
identifying by the second device controller, a test error due to a second screen content of the second mobile device that does not corresponds to the navigation control.

14. The method of claim 11 further comprising:
storing third client dependent data on a third client controller in communication with the mobile test framework; and
transmitting by the mobile test framework, the navigation control through the third device controller to a third mobile device having a third platform that is different than the first platform or the second platform.

15. The method of claim 14 further comprising:
storing third platform dependent data on a first second controller in communication with the client controller; and
verifying by the third device controller, a third screen content of the third mobile device that corresponds to the navigation control.

16. The method of claim 14 further comprising:
storing third platform dependent data on a third device controller in communication with the third client controller; and
identifying by the third device controller, a test error due to a third screen content of the third mobile device that does not corresponds to the navigation control.

17. A method for testing mobile devices in an online demand service environment, the method comprising:
providing a mobile test framework for testing a mobile application, wherein the mobile test framework is configured to remotely operate a plurality of mobile devices;
storing first platform dependent data on a first device controller in communication with the client controller, wherein the first device controller resides outside the mobile test framework;
transmitting by the mobile test framework, a first navigation control through the first device controller to a first mobile device having a first platform;
verifying by the first device controller, a screen content of the first mobile device that corresponds to the first navigation control;
storing second platform dependent data on a second device controller in communication with the client controller, wherein the second client controller resides outside the mobile test framework; and
transmitting by the mobile test framework, the first navigation control through the second device controller to a second mobile device having a second platform that is different than the first platform;
verifying by the second device controller, a screen content of the second mobile device that corresponds to the first navigation control.

18. The method of claim 17 further comprising:
transmitting by the mobile test framework, a second navigation control through the first device controller to the first mobile device;
verifying by the first device controller, the screen content of the first mobile device that corresponds to the second navigation control;
transmitting by the mobile test framework, the second navigation control through the second device controller to a second mobile device; and
verifying by the second device controller, the screen content of the second mobile device that corresponds to the second navigation control.

19. The method of claim 17 further comprising:
identifying by the first device controller, a first test error due to the screen content of the first mobile device that does not corresponds to the first navigation control.

20. The method of claim 19 further comprising:
identifying by the first device controller, a second test error due to the screen content of the first mobile device that does not corresponds to the second navigation control.

21. The method of claim 9 further comprising:
storing first platform dependent data on a first device controller in communication with the client controller; and
verifying by the first device controller, a first screen content of the first mobile device that corresponds to the navigation control.

* * * * *